(12) United States Patent
Chen et al.

(10) Patent No.: US 10,326,805 B2
(45) Date of Patent: Jun. 18, 2019

(54) DISTRIBUTED ADAPTIVE BIT RATE PROXY SYSTEM

(71) Applicant: Broadcom Corporation, Irvine, CA (US)

(72) Inventors: Xuemin Chen, Rancho Santa Fe, CA (US); Yong Li, San Diego, CA (US); Rajesh Shankarrao Mamidwar, San Diego, CA (US); Hongtao Zhu, San Jose, CA (US)

(73) Assignee: AVAGO TECHNOLOGIES INTERNATIONAL SALES PTE. LIMITED, Singapore (SG)

( * ) Notice: Subject to any disclaimer, the term of this patent is extended or adjusted under 35 U.S.C. 154(b) by 1315 days.

(21) Appl. No.: 13/938,157

(22) Filed: Jul. 9, 2013

(65) Prior Publication Data

US 2014/0355625 A1    Dec. 4, 2014

Related U.S. Application Data

(60) Provisional application No. 61/830,008, filed on May 31, 2013.

(51) Int. Cl.
*H04L 29/06*    (2006.01)

(52) U.S. Cl.
CPC ...... *H04L 65/1026* (2013.01); *H04L 65/4084* (2013.01); *H04L 65/605* (2013.01)

(58) Field of Classification Search
None
See application file for complete search history.

(56) References Cited

U.S. PATENT DOCUMENTS

| | | | | |
|---|---|---|---|---|
| 8,532,171 B1* | 9/2013 | Narayanan | ......... | H04N 21/8451 375/240.01 |
| 2009/0254657 A1* | 10/2009 | Melnyk | ................... | H04L 47/10 709/224 |
| 2010/0161325 A1* | 6/2010 | Hellwig | ................ | H04L 5/1438 704/229 |
| 2010/0208585 A1* | 8/2010 | Witzel | .................. | H04W 28/16 370/230 |
| 2010/0305943 A1* | 12/2010 | Witzel | .................... | H04L 47/38 704/201 |

(Continued)

*Primary Examiner* — Gregory B Sefcheck
*Assistant Examiner* — Suk Jin Kang
(74) *Attorney, Agent, or Firm* — Morgan, Lewis & Bockius LLP

(57) ABSTRACT

A distributed adaptive bit rate (ABR) proxy system may include a gateway device that includes a first transcoder and is configured to receive segments of a content item from an ABR server, and a secondary device that includes a second transcoder and is configured to receive the segments of the content item from the gateway device. The first transcoder may transcode the segments based at least in part on a first ABR profile to generate first transcoded segments, and the second transcoder may transcode the segments based at least in part on a second ABR profile to generate second transcoded segments. The gateway device may advertise the first and second ABR profiles to user devices and may transmit the first transcoded segments to the user devices in response to requests therefor. The secondary device may transmit the second transcoded segments to the user devices in response to requests therefor.

20 Claims, 6 Drawing Sheets

(56) References Cited

U.S. PATENT DOCUMENTS

| | | | |
|---|---|---|---|
| 2011/0016231 A1* | 1/2011 | Ramaswamy | H04H 20/95 709/246 |
| 2011/0082924 A1* | 4/2011 | Gopalakrishnan | H04L 65/4084 709/223 |
| 2011/0283012 A1* | 11/2011 | Melnyk | H04L 47/10 709/231 |
| 2011/0283015 A1* | 11/2011 | Melnyk | H04L 47/10 709/233 |
| 2011/0314130 A1* | 12/2011 | Strasman | H04L 29/06 709/219 |
| 2012/0023148 A1* | 1/2012 | Long | H04N 19/164 707/827 |
| 2012/0042091 A1* | 2/2012 | McCarthy | H04N 7/17318 709/231 |
| 2012/0265847 A1* | 10/2012 | Swenson | H04L 65/1076 709/217 |
| 2012/0265901 A1* | 10/2012 | Swenson | H04L 65/1076 709/246 |
| 2013/0007297 A1* | 1/2013 | Soroushian | H04L 65/4084 709/231 |
| 2013/0007831 A1* | 1/2013 | Wu | H04N 21/23655 725/116 |
| 2013/0058393 A1* | 3/2013 | Soroushian | H04N 21/234372 375/240.01 |
| 2013/0086275 A1* | 4/2013 | Melnyk | H04L 47/10 709/231 |
| 2013/0091249 A1* | 4/2013 | McHugh | H04N 21/23439 709/219 |
| 2013/0125014 A1* | 5/2013 | Sharif-Ahmadi | G06F 17/30017 715/748 |
| 2013/0125167 A1* | 5/2013 | Sharif-Ahmadi | G06F 17/30017 725/37 |
| 2013/0179590 A1* | 7/2013 | McCarthy | H04N 21/8456 709/231 |
| 2013/0254341 A1* | 9/2013 | Ramakrishnan | H04L 47/25 709/219 |
| 2013/0268961 A1* | 10/2013 | Miles | H04N 21/23439 725/32 |
| 2013/0279602 A1* | 10/2013 | Wang | H04N 21/222 375/240.26 |
| 2013/0282874 A1* | 10/2013 | Swenson | H04L 65/1076 709/219 |
| 2013/0332971 A1* | 12/2013 | Fisher | H04N 21/266 725/93 |
| 2014/0072032 A1* | 3/2014 | Melnyk | H04L 47/10 375/240.02 |
| 2014/0109153 A1* | 4/2014 | Venkatraman | H04N 21/2343 725/62 |
| 2014/0140417 A1* | 5/2014 | Shaffer | H04N 21/8456 375/240.28 |
| 2014/0143823 A1* | 5/2014 | Manchester | H04L 65/4084 725/116 |
| 2014/0149557 A1* | 5/2014 | Lohmar | H04L 65/605 709/219 |
| 2014/0161050 A1* | 6/2014 | Grinshpun | H04L 65/4069 370/329 |
| 2014/0229579 A1* | 8/2014 | Johnson | H04L 65/60 709/219 |
| 2014/0241420 A1* | 8/2014 | Orton-Jay | H04N 19/0009 375/240.03 |
| 2014/0259054 A1* | 9/2014 | Miles | H04N 21/23439 725/32 |
| 2014/0280746 A1* | 9/2014 | Johns | H04L 67/06 709/219 |
| 2014/0280781 A1* | 9/2014 | Gregotski | H04L 65/60 709/219 |
| 2014/0280906 A1* | 9/2014 | Johns | H04L 45/22 709/224 |
| 2014/0281000 A1* | 9/2014 | Dattagupta | H04L 47/11 709/231 |
| 2014/0281002 A1* | 9/2014 | Sun | H04L 29/06455 709/231 |
| 2014/0281007 A1* | 9/2014 | Lemmons | H04N 21/2355 709/231 |
| 2014/0282771 A1* | 9/2014 | Tumuluru | H04N 21/2662 725/95 |
| 2014/0282986 A1* | 9/2014 | Leung | H04L 63/0807 726/9 |
| 2014/0325550 A1* | 10/2014 | Winograd | H04N 21/44236 725/19 |
| 2014/0331247 A1* | 11/2014 | Mick, Jr. | H04N 21/44204 725/19 |
| 2014/0344443 A1* | 11/2014 | MacInnis | H04L 43/08 709/224 |
| 2014/0351383 A1* | 11/2014 | Wan | H04L 65/4084 709/219 |
| 2014/0355958 A1* | 12/2014 | Soroushian et al. | 386/248 |
| 2014/0359678 A1* | 12/2014 | Shivadas | H04N 21/6587 725/88 |
| 2014/0359680 A1* | 12/2014 | Shivadas | H04N 21/8455 725/90 |
| 2014/0376623 A1* | 12/2014 | Good | H04N 19/46 375/240.07 |
| 2015/0070585 A1* | 3/2015 | Sharif-Ahmadi | G08C 17/02 348/564 |
| 2015/0074733 A1* | 3/2015 | Manchester | H04N 21/23439 725/93 |
| 2015/0200987 A1* | 7/2015 | Labrozzi | H04L 65/4092 709/219 |
| 2015/0326869 A1* | 11/2015 | Wang | H04N 21/222 375/240.26 |
| 2016/0119397 A1* | 4/2016 | Johnson | H04L 65/60 709/219 |
| 2017/0187611 A1* | 6/2017 | Johns | H04L 45/22 |

* cited by examiner

DISTRIBUTED ADAPTIVE BIT RATE PROXY SYSTEM

CROSS-REFERENCE TO RELATED APPLICATIONS

The present application claims the benefit of U.S. Provisional Patent Application Ser. No. 61/830,008, entitled "Distributed Adaptive Bit Rate Proxy System," filed on May 31, 2013, which is hereby incorporated by reference in its entirety for all purposes.

TECHNICAL FIELD

The present description relates generally to a proxy system, and more particularly, but not exclusively, to a distributed adaptive bit rate (ABR) proxy system.

BACKGROUND

An adaptive bit rate (ABR) server in a content delivery network (CDN) encodes a content item into multiple streams of different bit rates, with each stream being divided into sequential segments of a given duration (e.g. 2-10 seconds). The ABR server may transmit a manifest file to user devices in a home via a gateway device, such as a home router. The manifest file lists the segments of the content item, the bit rate at which each segment has been encoded, e.g. adaptive bit rate profile for the segment, and a network identifier for accessing each segment, e.g. a uniform resource locator (URL). At any given time, a user device may select to retrieve a segment that is coded at a bit rate that is appropriate for the user device, e.g. based on network bandwidth conditions and device capabilities that are determinable by the user device. However, the user device may only be directly aware of the network bandwidth conditions of the local network between the user device and the gateway device. The user device may not be directly aware of the network bandwidth conditions between the gateway device and the ABR server.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced using one or more implementations. In one or more instances, structures and components are shown in block diagram form in order to avoid obscuring the concepts of the subject technology.

Figure 1:
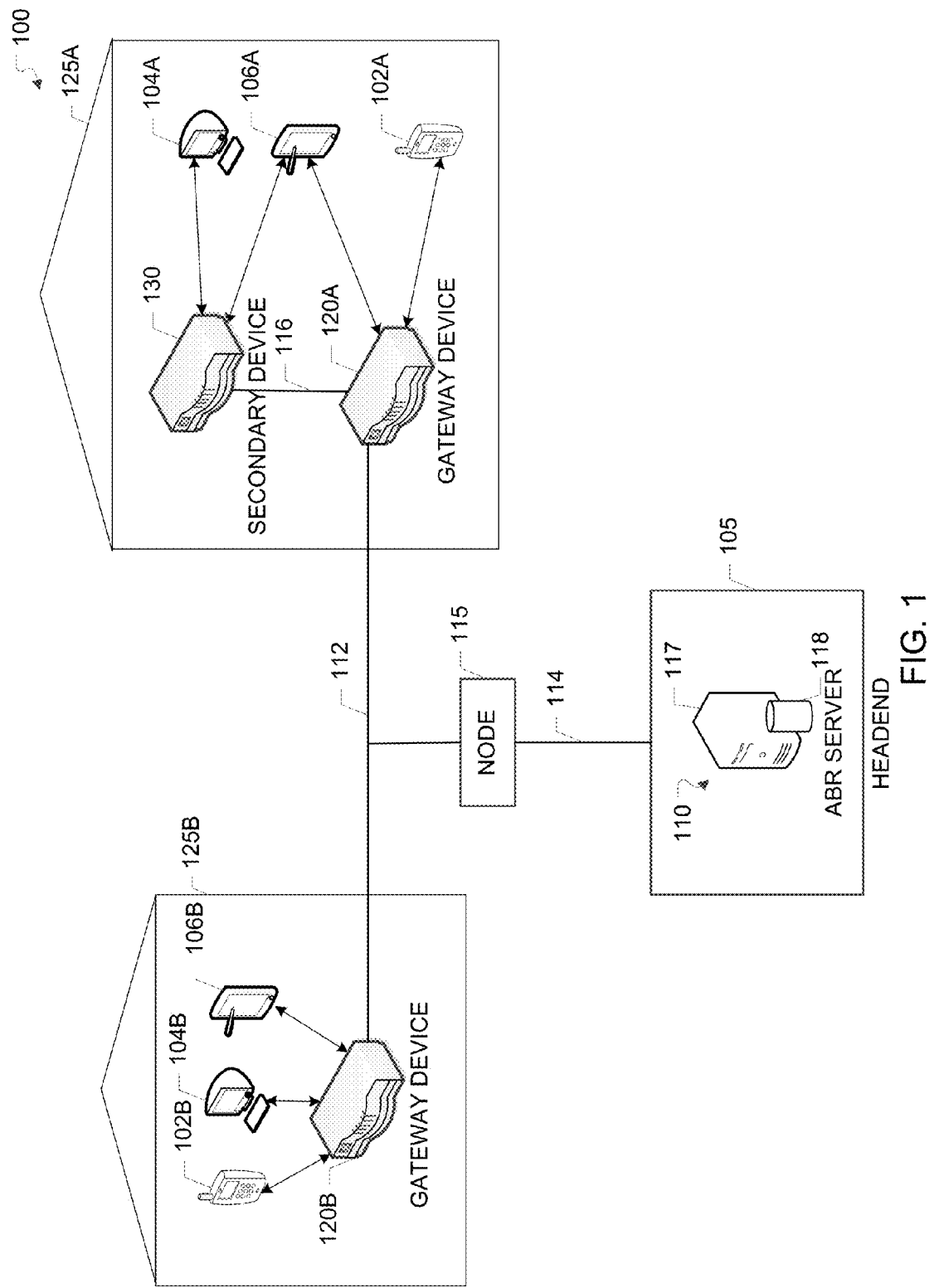
FIG. 1 illustrates an example network environment in which a distributed adaptive bit rate proxy system may be implemented in accordance with one or more implementations.

FIG. 1 illustrates an example network environment 100 in which a distributed adaptive bit rate proxy system may be implemented in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The example network environment 100 includes a headend 105, a first transmission line 114, a node 115, a second transmission line 112, and units 125A-B. The headend 105 may include, or may be communicatively coupled to, an ABR server 110. The unit 125A includes a gateway device 120A, a third transmission line 116, a secondary device 130, and electronic devices 102A, 104A, 106A. The unit 125B includes a gateway device 120B and electronic devices 102B, 104B 106B. The units 125A-B may be buildings, dwelling units, houses, offices, or any generally structures. For explanatory purposes, the units 125A-B are illustrated as being different buildings; however, the units 125A-B may be within the same building, such as within an apartment building or an office building.

The electronic devices 102A-B, 104A-B, 106A-B can be computing devices such as laptop or desktop computers, smartphones, personal digital assistants ("PDAs"), portable media players, set-top boxes, tablet computers, televisions or other displays with one or more processors coupled thereto and/or embedded therein, or other appropriate computing devices that can be used for adaptive bit rate streaming, and rendering, of multimedia content and/or can be coupled to such a device. In the example of FIG. 1, the electronic devices 102A-B are depicted as smart phones, the electronic devices 104A-B are depicted as desktop computers, and the electronic devices 106A-B are depicted as tablet devices. In one or more implementations, any of the electronic devices 102A-B, 104A-B, 106A-B may be referred to as a user device.

The headend 105 may include one or more devices, such as network devices, transmitters, receivers, etc., that are part of a content delivery network (CDN) that coordinates the delivery of content items, such as television programs, movies, audio programs, or generally any content items. The content delivery network may deliver the content items to the electronic devices 102A-B, 104A-B, 106A-B, e.g. via the node 115 and the gateway devices 120A-B. The headend 105 may also provide Internet service to the electronic devices 102A-B, 104A-B, 106A-B, e.g. via the node 115 and the gateway devices 120A-B.

The headend 105 may be coupled to the node 115 via the first transmission line 114. The first transmission line 114 may be a fiber optic cable, and the headend 105 and the node 115 may be configured to transmit optical signals over the fiber optic cable. In one or more implementations, other types of transmission lines may be used. The node 115 may be communicatively coupled to the gateway devices 120A-B via the second transmission line 112. In one or more implementations, the node 115 may be coupled to additional gateway devices (not shown) via the second transmission line 112. The second transmission line 112 may be a coaxial transmission line. The node 115 and the gateway devices 120A-B may be configured to transmit signals over the second transmission line 112, such as radio frequency (RF) signals. Accordingly, the node 115 may be configured to convert optical signals received from the headend 105 over the first transmission line 114 into RF signals for transmission to the gateway devices 120A-C over the second transmission line 112. Similarly, the node 115 may be configured to convert RF signals received from the gateway devices 120A-B over the second transmission line 112 into optical signals for transmission to the headend 105 over the first transmission line 114.

The secondary device 130 may be coupled to the gateway device 120A via a third transmission line 116. The third transmission line 116 may be the same medium as the second transmission line 112, e.g. a coaxial transmission line. In one or more implementations, the secondary device 130 may include the same hardware as the gateway device 120A. However, the secondary device 130 may not be coupled to the second transmission line 112 and/or the secondary device 130 may not be configured to directly communicate with the headend 105.

The gateway devices 120A-C may be configured to communicate directly over the second transmission line 112, e.g. without communicating through the node 115 and/or the headend 105. In one or more implementations, the bandwidth utilization of the first transmission line 114 may be high, while the bandwidth utilization on the second transmission line 112 may be low. Thus, it may be desirable to utilize the second transmission line 112 rather than the first transmission line 114, when possible.

The ABR server 110 may include, or may be coupled to, one or more processing devices 117 and/or a data store 118. The one or more processing devices 117 execute computer instructions stored in the data store 118, for example, to implement a content delivery network. The data store 118 may store the computer instructions on a non-transitory computer-readable medium. The data store 118 may further store one or more content items that are ABR streamed by the ABR server 110. In one or more implementations, the ABR server 110 may be a single computing device such as a computer server. Alternatively, the ABR server 110 may represent multiple computing devices that are working together to perform the actions of a server computer (such as a cloud of computers and/or a distributed system). The ABR server 110 may be coupled with various databases, storage services, or other computing devices, that may be collocated with the ABR server 110 or may be disparately located from the ABR server 110.

The ABR server 110 may provide ABR streaming for content items delivered by the CDN. For example, the ABR server 110 may encode a content item into multiple streams having different encoding characteristics, such as different bit rates, different frame rates, different resolutions, different codecs, or generally any encoding characteristic. In one or more implementations, the encoding characteristics of a given stream may be referred to as the adaptive bit rate (ABR) profile of the stream. The ABR server 110 divides each stream into sequential segments of a given duration (e.g. 2-10 seconds). The ABR server 110 generates a manifest file that lists the available segments, the different ABR profiles of the segments, and network identifiers for accessing each segment, such as a uniform resource locator (URL). The ABR server 110 transmits the manifest file to the gateway devices 120A-B. At any given time, the gateway devices 120A-B may select to retrieve one of the segments from the ABR server 110, e.g. based on network bandwidth conditions between the gateway devices 120A-B and the ABR server 110 and/or based on the capabilities of the gateway devices 120A-B, such as the codecs that are decodable by the gateway devices 120A-B.

The gateway devices 120A-B and/or the secondary device 130 may include a network processor or a network device, such as a switch or a router, that is configured to couple the electronic devices 102A-B, 104A-B, 106A-B to the headend 105. The gateway devices 120A-B and/or the secondary device 130 may include local area network interfaces, such as wired interfaces and/or wireless access points, for communicating with the electronic devices 102A-B, 104A-B, 106A-B. In one or more implementations, the gateway devices 120A-B and/or the secondary device 130 may be, or may include, a set-top box, e.g. a device that is coupled to a display, such as a television, and is capable of rendering multimedia content on the display. In addition to retrieving segments of ABR streams from the ABR server 110, the gateway devices 120A-B may receive streams from the headend 105 that include content items, such as television programs, movies, or generally any content items.

The gateway devices 120A-B may act as ABR intermediaries, or ABR proxy devices, between the ABR server 110 and the electronic devices 102A-B, 104A-B, 106A-B. For example, the gateway devices 120A-B may retrieve segments of a content item at an appropriate bit rate that is determined based on the network bandwidth conditions between the gateway devices 120A-B and the ABR server 110. The gateway devices 120A-B may then transcode the segments in accordance with one or more adaptive bit rate profiles. The gateway devices 120A-B may generate a manifest file that lists the different transcoded versions of the segments, in addition to the originally retrieved segments. The gateway devices 120A-B may transmit the manifest file to the electronic devices 102A-B, 104A-B, 106A-B. The electronic devices 102A-B, 104A-B, 106A-B may retrieve segments from the gateway devices 120A-B at the available bit rates that are appropriate for the electronic devices 102A-B, 104A-B, 106A-B, e.g. based on the capabilities of the electronic devices 102A-B, 104A-B, 106A-B and/or the network bandwidth conditions between the electronic devices 102A-B, 104A-B, 106A-B and the gateway devices 120A-B. Thus, the gateway devices 120A-B may include local ABR servers that perform local ABR streaming functions for the electronic devices 102A-B, 104A-B, 106A-B. An example gateway device 120A that includes ABR components is discussed further below with respect to FIG. 3.

In one or more implementations, the gateway device 120A may utilize transcoders located in the secondary device 130 in order to provide access to additional adaptive bit rate profiles to the electronic devices 102A, 104A, 106A. For example, the secondary device 130 may be a set-top box (STB) that includes one or more transcoders that is located in a secondary room of the unit 125A, such as a bedroom, and that includes a wireless access point for communicating with the electronic devices 102A, 104A, 106A. The gateway device 120A retrieves segments of a content item from the ABR server 110, e.g. based on network bandwidth conditions between the gateway device 120A and the ABR server 110, and the gateway device 120A transmits the segments (before transcoding) to the secondary device 130 along with an indication of one or more transcodings to be performed by the secondary device 130. The secondary device 130 may transcode the received segments in accordance with the transcoding indicated by the gateway device 120A.

The gateway device 120A generates and transmits a manifest file to the electronic devices 102A, 104A, 106A that includes the additional profiles for which the secondary device 130 is performing the transcoding. The electronic devices 102A, 104A, 106A may retrieve the segments directly from the secondary device 130, e.g. via the wireless access point of the secondary device 130 when such a connection is available, or through the gateway device 120A when a direct connection to the secondary device 130 is not available. For example, the secondary device 130 transmits the transcoded segments back to the gateway device 120A for transmission to the electronic devices 102A, 104A, 106A. An example process of distributed ABR proxy system is discussed further below with respect to FIG. 4.

In one or more implementations, a distributed ABR proxy system may be implemented across the units 125A-B. For example, the gateway device 120B of the unit 125B may utilize the available transcoders of the gateway device 120A of the unit 125A to increase the number of adaptive bit rate profiles that can be transcoded and advertised to the electronic devices 102B, 104B, 106B. An example implementation of a distributed adaptive bit rate proxy system across the units 125A-B is discussed further below with respect to FIG. 2.

The distributed ABR proxy system may also be used to distribute content across the units 125A-B, e.g. when the gateway devices 125A-B receive ABR distributed content from a common service provider, such as the headend 105. For example, the gateway devices 120A-B may cache received segments, and/or transcoded segments, of content items. In one or more implementations the gateway device 120A may include a mass storage unit, such as a hard drive, for storing received segments of content items. The gateway device 120A may periodically generate a manifest files that list the locally cached segments, and the gateway device 120A may transmit the manifest file to the gateway device 120B and/or the electronic devices 102A, 104A, 106A. In one or more implementations, the locally cached segments may also include segments corresponding to content that was recorded through the gateway device 120A.

The gateway device 120B may receive the manifest file from the gateway device 120A and may merge the entries of the manifest file with a manifest file provided by the gateway device 120B to the electronic devices 102B, 104B, 106B. If the electronic device 102B requests, from the gateway device 120B, one of the segments that is locally cached at the gateway device 120A, the gateway device 120B may retrieve the segment from the gateway device 120A, e.g. over the second transmission line 112, and provide the segment to the electronic device 102B. In one or more implementations, if the segment is available from both the gateway device 120A and the ABR server 110, the gateway device 120B may retrieve the segment from the gateway device 120A, e.g. to reduce latency and decrease the bandwidth utilization of the first transmission line 114.

In one or more implementations, gateway devices 120A-B may be configured such that the gateway device 120A with the highest available bandwidth for communicating with the ABR server 110 retrieves segments from the ABR server 110 and serves the segments to the gateway device 120B, in the manner previously discussed with respect to locally cached segments. Alternatively, or in addition, the gateway devices 120A-B may each be configured to retrieve segments of different content items from the ABR server 110 or from another ABR server (not shown). The gateway devices 120A-B may then ABR stream the segments to one another, e.g. without having to retrieve the segments again from the ABR server 110.

In one or more implementations, the node 115 may also function as an ABR proxy device, or an ABR intermediary device, between the gateway devices 120A-B and the ABR server 110. The node 115 may locally cache segments that pass through the node 115, the node 115 may generate a manifest file that lists the locally cached segments, and the node 115 may provide the manifest file to the gateway devices 120A-B. In one or more implementations, the node 115 may monitor requests for segments that are transmitted by the gateway devices 120A-B to the ABR server 110. If the node 115 identifies a segment requested by the gateway device 120A that is cached locally at the node 115, the node 115 may intercept the request and may provide the locally cached segment to the gateway device 120A, rather than passing the request through to the ABR server 110.

Figure 2:
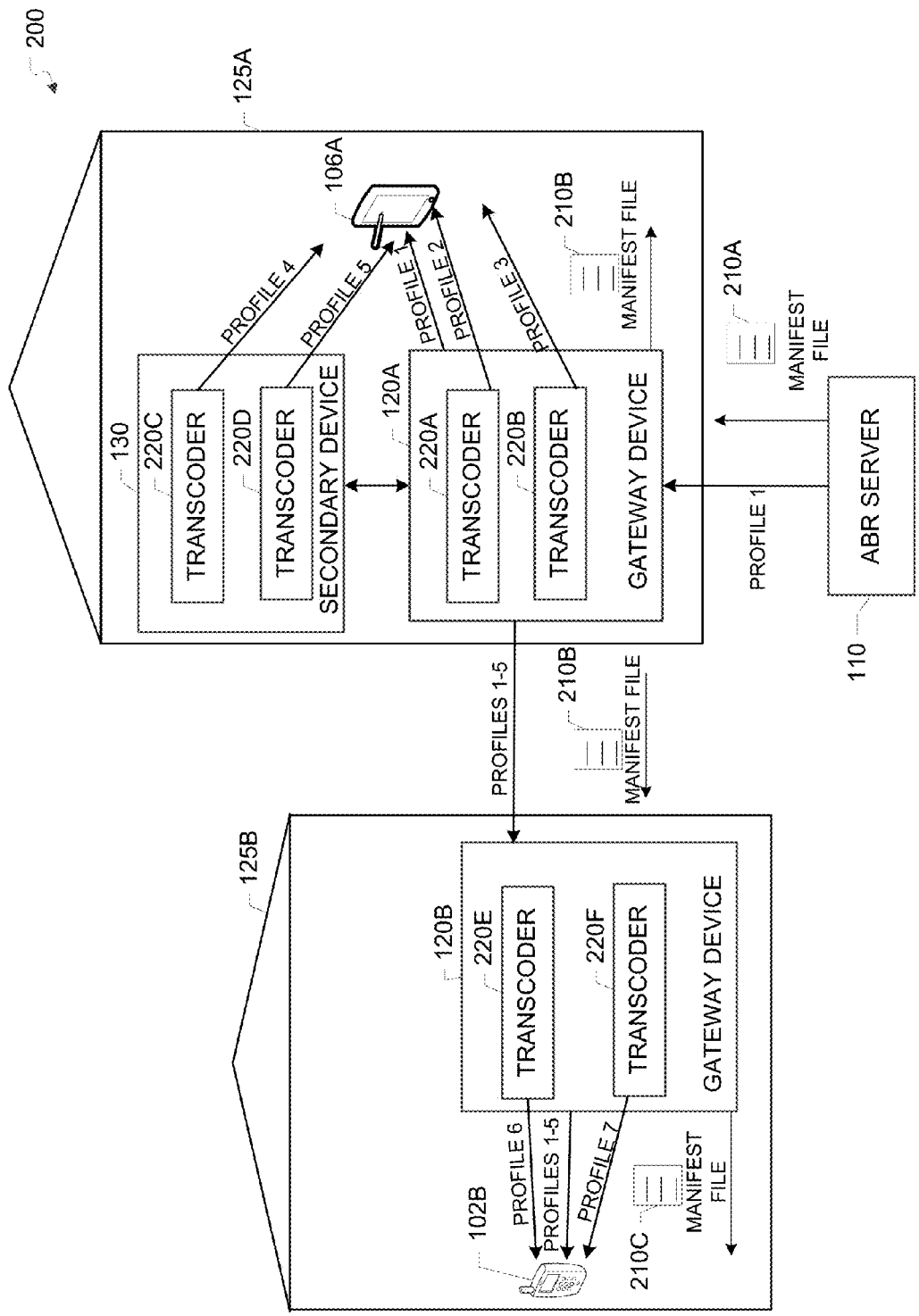
FIG. 2 is a conceptual illustration of an example implementation of a distributed adaptive bit rate proxy system in accordance with one or more implementations.

FIG. 2 is a conceptual illustration of an example implementation 200 of a distributed adaptive bit rate proxy system in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

For explanatory purposes, the implementation 200 is discussed with respect to a single segment; however, multiple segments may continuously be streamed throughout the implementation 200. In the implementation 200, the gateway device 120A receives a manifest file 210A from the ABR server 110. The manifest file 210A may list segments of content items that are being ABR streamed by the ABR server 110, along with the different profiles of the segments that are available. The gateway device 120A may request a segment of a first profile from the ABR server 110, e.g. in response to a request for the segment from the electronic device 106A. The ABR server 110 may transmit the segment to the gateway device 120A. The gateway device 120A may use the transcoders 220A-B to generate a second profile and a third profile for the segment. The gateway device 120A may also transmit the segment, with an indication of a fourth and fifth profile, to the secondary device 130. The secondary device 130 may use the transcoders 220C-D to generate a fourth profile and a fifth profile for the segment.

In one or more implementations, the gateway device 120A may retrieve first and second segments of a first profile of a content item from the ABR server 110. The gateway device 120A may use transcoders 220A-B to generate the second, third, fourth and fifth profiles for the first segment. The gateway device 120A may transmit the second segment to the secondary device 130 and the secondary device 130 may use the transcoders 220C-D to generate the second, third, fourth, and fifth profiles for the second segment. In this manner, the decoding cycles of the transcoders 220A-D may be reduced by consolidating the transcoding of the first segment with the transcoders 220A-B and the second segment with the transcoders 220C-D. The gateway device 120A and the secondary device 130 may continue to transcode alternating segments of the content item. For example, the gateway device 120A may transcode the first, third, fifth, etc., segments of the content item while the secondary device 130 may transcode the second, fourth, sixth, etc., segments of the content item.

The gateway device 120A may then generate a manifest file 210B that lists the first, second, third, fourth, and fifth profiles for the segment. In one or more implementations, the manifest file 210B may also include one or more segments that are listed in the manifest file 210A, and/or any segments that are locally cached by the gateway device 120A. The gateway device 120A may transmit the manifest file 210B to the electronic device 106A. In one or more implementations, the gateway device 120A may provide the first, second, or third profiles of the segment to the electronic device 106A, in response to a request therefor. If the secondary device 130 is in direct communication with the electronic device 106A, e.g. via a wireless access point, the secondary device 130 may provide the fourth and fifth profiles of the segment directly to the electronic device 106A, in response to a request therefor. If the secondary device 130 is not in direct communication with the electronic device 106A, the secondary device 130 may provide the fourth and fifth profiles of the segment to the electronic device 106A via the gateway device 120A. In one or more implementations, the gateway device 120A may provide the first, second, third, fourth, and fifth profiles of alternating segments of the content item, e.g. the first, third, fifth, etc., segments, while the secondary device 130 may provide the first, second, third, fourth, and fifth profiles of the remaining alternating segments of the content item, e.g. the second, fourth, sixth, etc., segments.

The gateway device 120A may also transmit the manifest file 210B to the gateway device 120B and/or may transmit the segment received from the ABR server 110 to the gateway device 120B. The gateway device 120B may use the transcoders 220E-F to generate a sixth profile and a seventh profile for the segment. The gateway device 120B may merge the entries of the manifest file 210B into a manifest file 210C, e.g. that lists the sixth and seventh profiles for the segment, and the gateway device 120B may provide the manifest file 210C to the electronic device 102B. In one or more implementations, the gateway device 120B maps the URLs of the gateway device 120A that are listed in the manifest file 210B to local URLs of the gateway device 120B, and the gateway device 120B lists the local URLs in the manifest file 210C. If the gateway device 120B receives a request from the electronic device 102B for a segment that is associated with a local URL that is mapped to a URL of the gateway device 120A, the gateway device 120B retrieves the requested segment from the gateway device 120A and provides the requested segment to the electronic device 102B.

Figure 3:
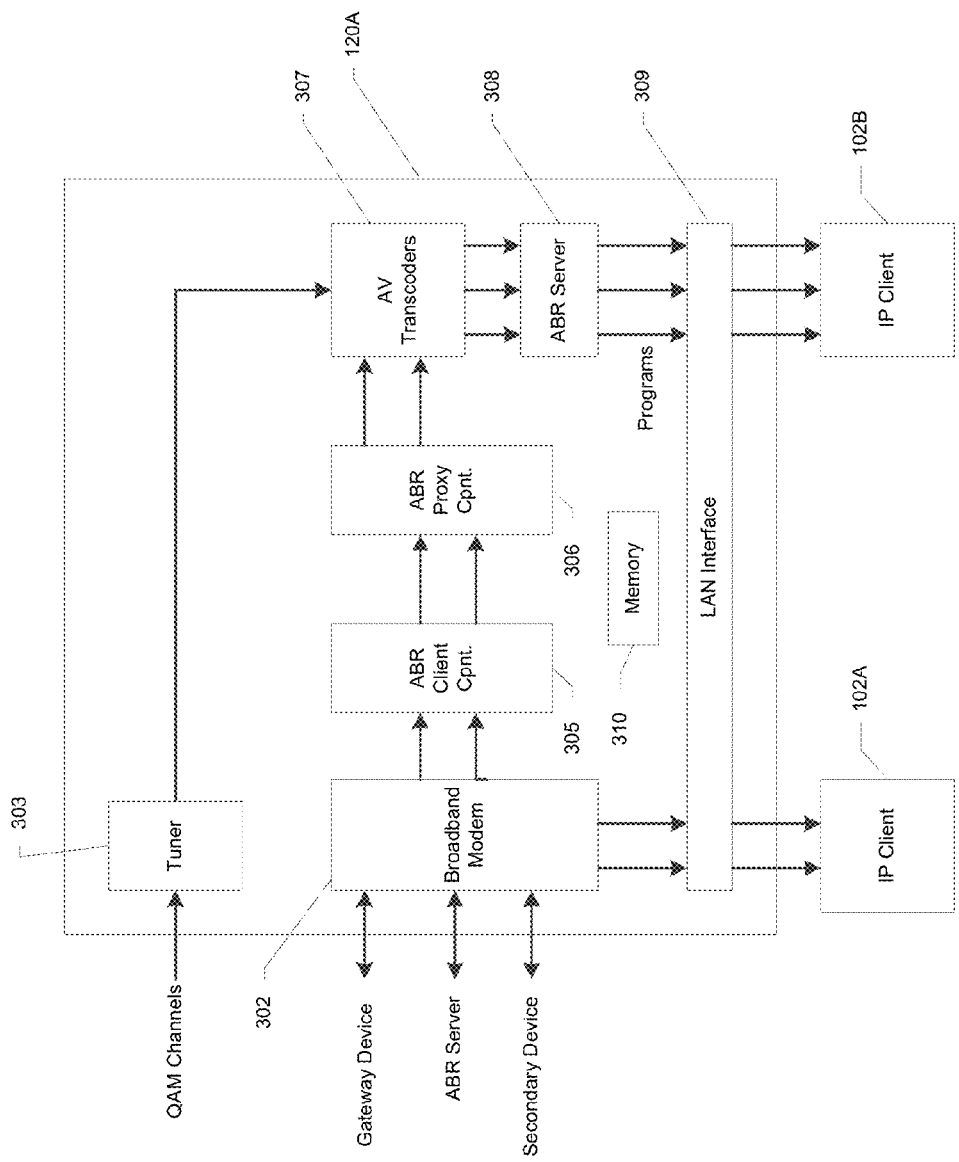
FIG. 3 illustrates an example gateway device that may be used in a distributed adaptive bit rate proxy system in accordance with one or more implementations.

FIG. 3 illustrates an example gateway device 120A that may be used in a distributed adaptive bit rate proxy system in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The gateway device 120A includes a broadband modem 302 (e.g., a cable modem), a multi-tuner 303, such as a QAM (quadrature amplitude modulation) tuner or an ATSC (Advanced Television Systems Committee) tuner, an ABR client component 305, an ABR proxy component 306, one or more audio/video transcoders 307, an embedded local ABR server 308, one or more local area network (LAN) interfaces 309, and a memory 310. In one or more implementations, the QAM channels may be received at the tuner 303, transcoded by the audio/video transcoders 307, converted to IP streams, and then ABR streamed by the local ABR server 308 via the LAN interfaces 309. The LAN interfaces 309 may include, for example, one or more Ethernet interfaces, such as 802.3 interfaces, one or more coaxial interfaces, one or more wireless interfaces, such as 802.11 interfaces, or the like.

The gateway device 120A may be configured to communicate with other gateway devices, e.g. the gateway device 120B, the ABR server 110, and/or secondary devices 130 via the broadband modem 302. The broadband modem 302 may act as a data pipe for the ABR client component 305, which selects an appropriate data rate for receiving a stream based on network conditions, e.g. between the gateway device 120A and the ABR server 110.

The gateway device 120A includes a local ABR server 308 that is configured to operate as a local ABR server for IP client devices, e.g. the electronic devices 102A, 104A. The gateway device 120A includes the ABR client component 305 that is configured to communicate with the ABR server 110 and/or other gateway devices 120B that include an ABR server. The ABR proxy component 306 operates to provide optimal matching between the LAN and WAN in terms of achievable quality-of-experience for the connected local client devices, making use of audio/video transcoders 307 when necessary. The ABR proxy component 306 may merge received manifest files, e.g. from the ABR server 110 and/or the gateway device 120B, with a locally generated manifest file. The memory 310 may be configured to cache, or store, one or more received segments of content items, e.g. for later transmission to the electronic devices 102A, 104A, 106A.

Figure 4:
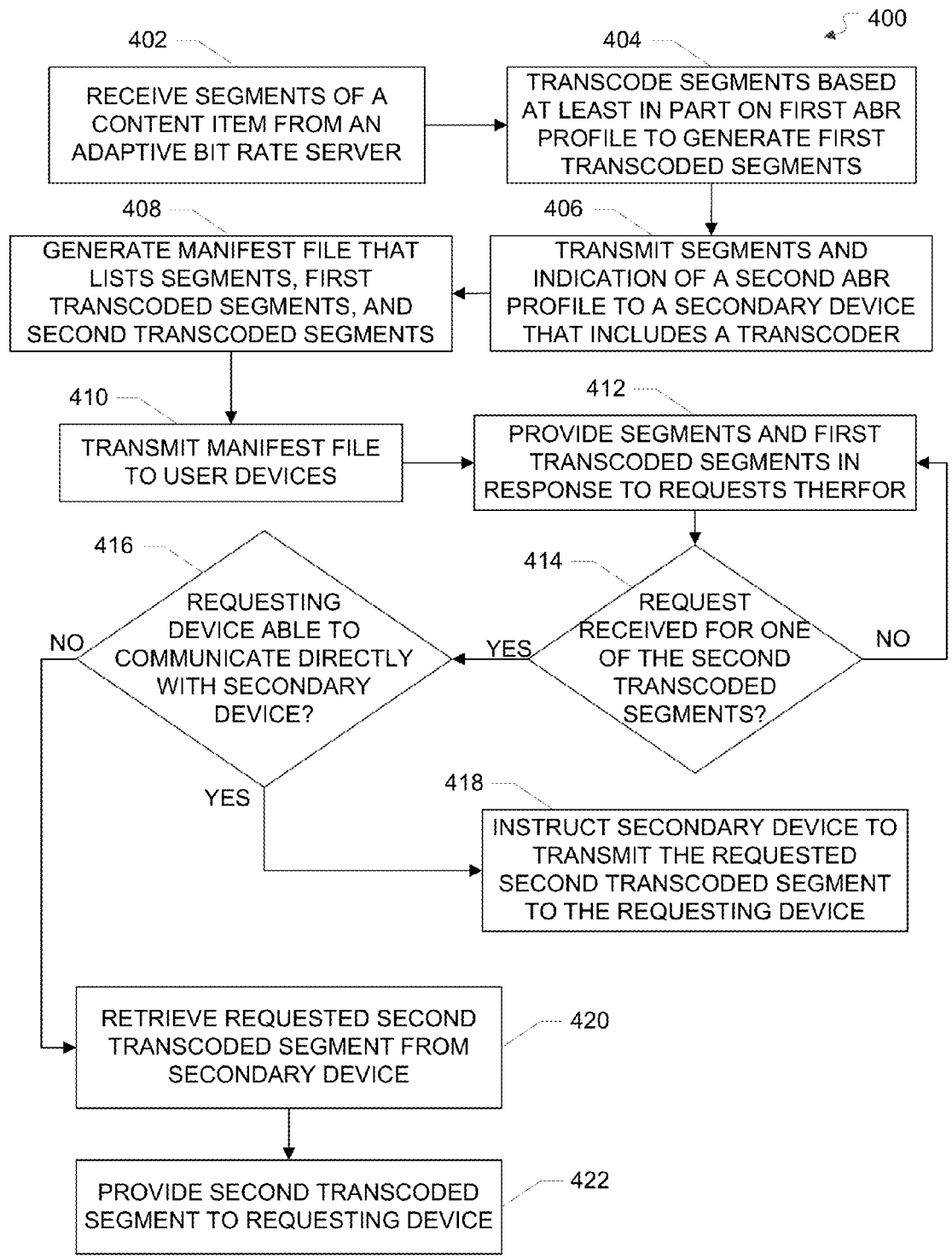
FIG. 4 illustrates a flow diagram of an example process of a distributed adaptive bit rate proxy system in accordance with one or more implementations.

FIG. 4 illustrates a flow diagram of an example process 400 of a distributed adaptive bit rate proxy system in accordance with one or more implementations. For explanatory purposes, the example process 400 is described herein with reference to the gateway device 120A of FIGS. 1-3; however, the example process 400 is not limited to the gateway device 120A of FIGS. 1-3, and the example process 400 may be performed by one or more other components of the gateway device 120A. Further for explanatory purposes, the blocks of the example process 400 are described herein as occurring in serial, or linearly. However, multiple blocks of the example process 400 may occur in parallel. In addition, the blocks of the example process 400 need not be performed in the order shown and/or one or more of the blocks of the example process 400 need not be performed.

The gateway device 120A receives segments of a content item from the ABR server 110 (402). For example, the gateway device 120A may request the highest quality segments of a content item that are provided by the ABR server 110, as indicated in a manifest file that is provided by the ABR server 110. The content item may be content that is being rendered by one of the electronic devices 102A, 104A, 106A, such as the electronic device 102A. The gateway device 120A transcodes the segments, e.g. using the transcoder 220A, based at least in part on a first ABR profile to generate first transcoded segments (404). The first ABR profile may be a profile that was requested by the electronic device 102A.

The gateway device 120A transmits the segments and an indication of a second ABR profile to the secondary device 130, e.g. over the third transmission line 116 (406). The second ABR profile may be a profile requested by another electronic device 104A. The gateway device 120A generates a manifest file that lists the received segments, the first transcoded segments and the second transcoded segments (408). The manifest file may include URLs that are associated with the gateway device 120A for accessing the received segments, the first transcoded segments, and the second transcoded segments. The gateway device 120A transmits the manifest file to the electronic devices 102A, 104A, 106A (410).

The gateway device 120A provides the original segments and the first transcoded segments to the electronic devices 102A, 104A, 106A in response to requests therefor, such as HTTP requests (412). The gateway device 120A determines whether a request has been received from an electronic device 102A for one of the second transcoded segments (414). For example, the gateway device 120A may determine that a request has been received for one of the second transcoded segments when an electronic device 102A requests the URL associated with one of the second transcoded segments. If the gateway device 120A determines that no requests have been received for the second transcoded segments (414), the gateway device 120A continues to provide the original segments and the first transcoded segments in response to requests therefor (412).

If the gateway device 120A determines that a request has been received for one of the second transcoded segments (414), e.g. from the electronic device 102A, the gateway device 120A determines whether the requesting device, e.g. the electronic device 102A is able to communicate directly with the secondary device 130 (416). For example, the gateway device 120A may be able to access a list of wireless client devices that are connected to the secondary device 130. If the gateway device 120A determines that the electronic device 102A is able to communicate directly with the secondary device 130 (416), the gateway device 120A sends an instruction, such as a control command over the third transmission line 116, to the secondary device 130 to transmit the requested segment to the electronic device 102A (418). In one or more implementations, the gateway device 120A may provide HTTP session information with respect to the electronic device 102A to the secondary device 130, such that the secondary device 130 can resume the HTTP session and seamlessly transmit the requested segment to the electronic device 102A.

If the gateway device 120A determines that the electronic device 102A is not able to communicate directly with the secondary device 130 (416), the gateway device 120A retrieves the requested segment from the secondary device 130, e.g. over the third transmission line 116 (420). The gateway device 120A then transmits the requested segment to the requesting device, e.g. the electronic device 102A (422).

Figure 5:
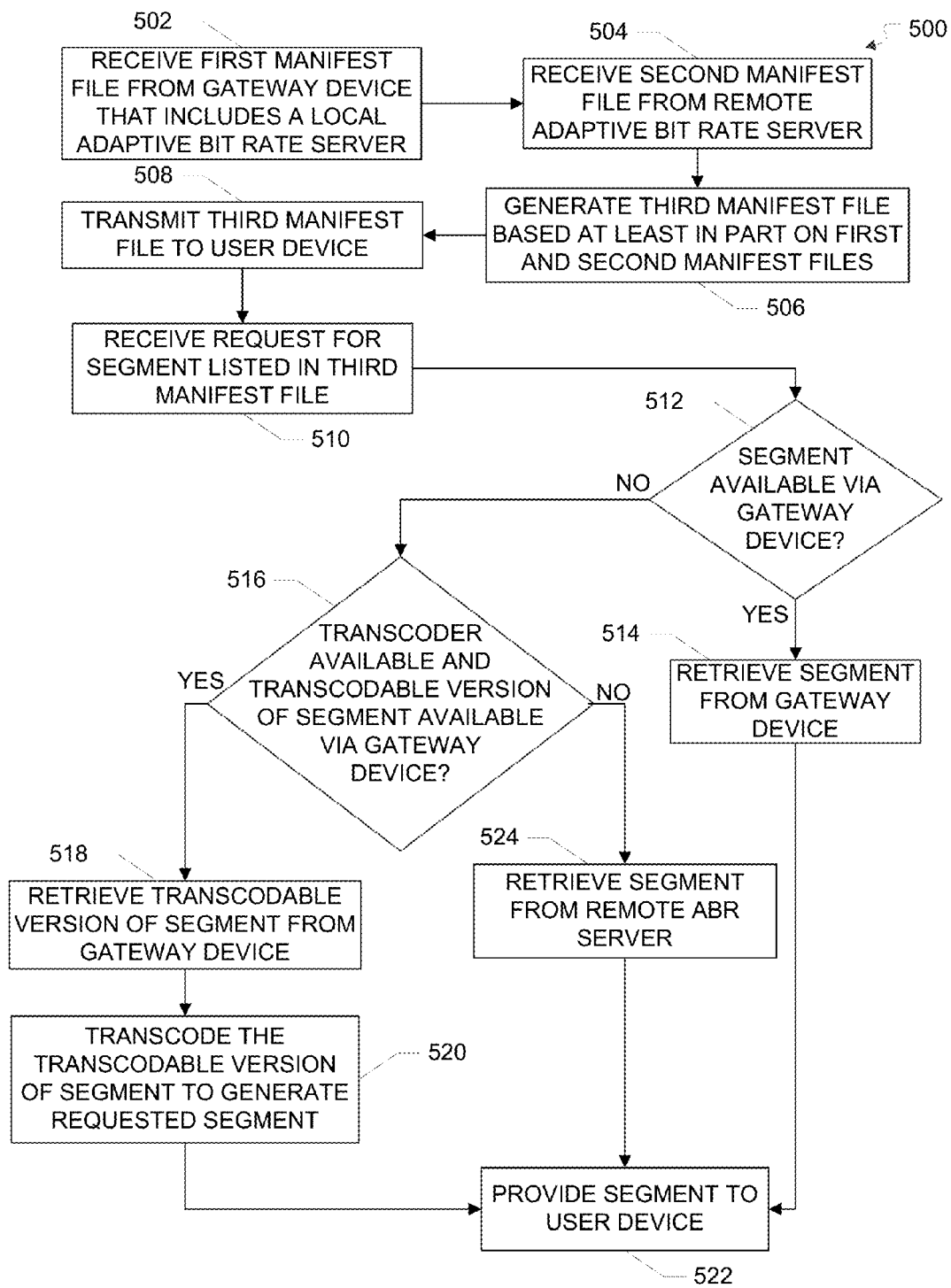
FIG. 5 illustrates a flow diagram of an example process of a distributed adaptive bit rate proxy system in accordance with one or more implementations.

FIG. 5 illustrates a flow diagram of an example process 500 of a distributed adaptive bit rate proxy system in accordance with one or more implementations. For explanatory purposes, the example process 500 is described herein with reference to the gateway devices 120A-B of FIGS. 1-3; however, the example process 500 is not limited to the gateway devices 120A-B of FIGS. 1-3, and the example process 500 may be performed by one or more other components of the gateway devices 120A-B. Further for explanatory purposes, the blocks of the example process 500 are described herein as occurring in serial, or linearly. However, multiple blocks of the example process 500 may occur in parallel. In addition, the blocks of the example process 500 need not be performed in the order shown and/or one or more of the blocks of the example process 500 need not be performed.

The gateway device 120B receives a first manifest file from a gateway device that includes a local ABR server, such as the gateway device 120A (502). The first manifest file may list the segments that are locally cached at the gateway device 120A and/or may lists segments that are available to the gateway device 120A via another content source, e.g. a different source than the ABR server 110. In one or more implementations, the gateway device 120A may be coupled to the gateway device 120B by a transmission line, such as the second transmission line 112. The gateway device 120B receives a second manifest file from a remote ABR server, such as the ABR server 110 (504). The second manifest file may list the segments that are available at the ABR server 110. In one or more implementations, the remote ABR server 110 may be communicatively coupled to the gateway device 120B through an intermediary device, such as the node 115. Thus, the remote ABR server 110 may not be coupled to the gateway device 120B via a single transmission line.

The gateway device 120B generates a third manifest file based at least in part on the first and second manifest files (506). For example, the gateway device 120B may merge the entries of the first and second manifest files into a third manifest file that lists the segments that are locally available at the gateway device 120B, e.g. cached or via local transcoders. In one or more implementations, the gateway device 120B may map the URLs of the first and second manifest files to local URLs of the gateway device 120B and the gateway device 120B may include the local URLs in the third manifest file. In one or more implementations, the gateway device 120B may omit any entries of the second manifest file for segments that are listed in the first manifest file. The gateway device 120B may periodically receive manifest files from the gateway device 120A and the ABR server 110, and the gateway device 120B may update the third manifest file accordingly.

The gateway device 120B transmits the third manifest file to a user device, such as the electronic device 102B (508). The gateway device 120B receives a request from the electronic device 102B for a segment of a given profile that is listed in the third manifest file (510). The gateway device 120B determines whether the segment of the given profile is available via the gateway device 120A (512). For example, the gateway device 120B may determine whether the requested URL is mapped to a URL of the gateway device 120A and/or if the most recently received first manifest file includes the requested segment of the given profile. If the gateway device 120B determines that the requested segment of the given profile is available from the gateway device 120A (512), the gateway device 120B retrieves the requested segment of the given profile from the gateway device 120A (514) and provides the requested segment to the gateway device 120B (522).

If the gateway device 120B determines that the requested segment of the given profile is not available from the gateway device 120A (512), the gateway device 120B determines whether a transcoder is available, e.g. within the gateway device 120B and/or via a secondary device 130, and determines whether a transcodable version of the segment is available from the gateway device 120A, e.g. the same segment of a different profile (516). If the gateway device 120B determines that a transcodable version of the segment is not available from the gateway device 120A, or that a transcoder is not available (516), the gateway device 120B retrieves the segment from the remote ABR server 110 (524) and provides the segment to the electronic device 102B (522).

If the gateway device 120B determines that a transcodable version of segment is available from the gateway device 120A, and that a transcoder is available (516), the gateway device 120B retrieves the transcodable version of the segment from the gateway device 120A (518), transcodes the transcodable version of the segment based at least in part on the given profile to generate the requested segment (520), and provides the requested segment to the electronic device 102B (522).

Figure 6:
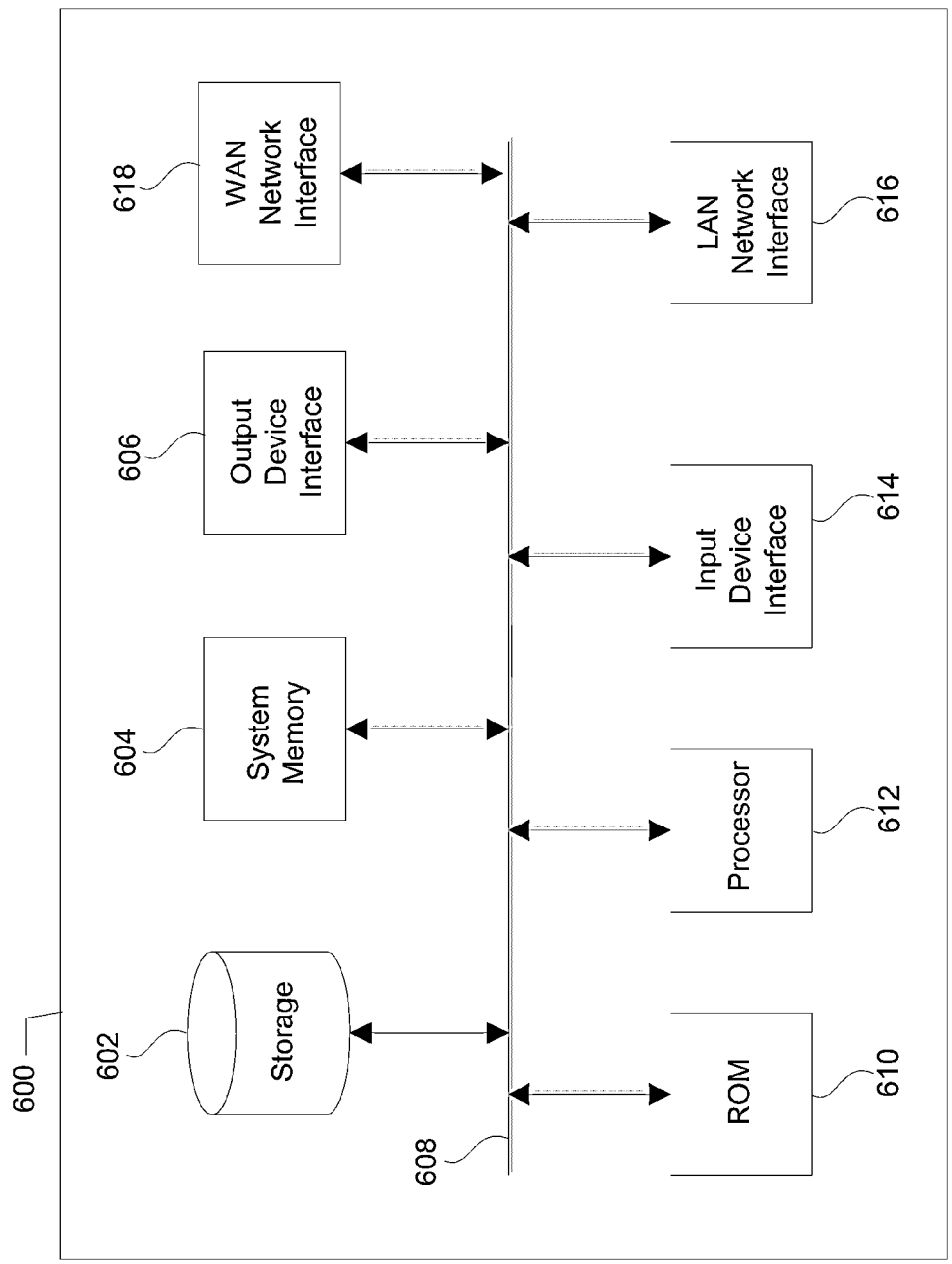
FIG. 6 conceptually illustrates an electronic system with which one or more implementations of the subject technology may be implemented.

FIG. 6 conceptually illustrates an electronic system 600 with which one or more implementations of the subject technology may be implemented. The electronic system 600, for example, can be a desktop computer, a laptop computer, a tablet computer, a server, a switch, a router, a base station, a receiver, a phone, a personal digital assistant (PDA), or generally any electronic device that transmits signals over a network. The electronic system 600 can be, and/or can be a part of, the ABR server 110, one or more of the gateway devices 120A-B, and/or one or more of the electronic devices 102A-B, 104A-B, 106A-B. Such an electronic system 600 includes various types of computer readable media and interfaces for various other types of computer readable media. The electronic system 600 includes a bus 608, one or more processing unit(s) 612, a system memory 604, a read-only memory (ROM) 610, a permanent storage device 602, an input device interface 614, an output device interface 606, a local area network (LAN) interface 616, and a wide area network (WAN) interface 618, or subsets and variations thereof.

The bus 608 collectively represents all system, peripheral, and chipset buses that communicatively connect the numerous internal devices of the electronic system 600. In one or more implementations, the bus 608 communicatively connects the one or more processing unit(s) 612 with the ROM 610, the system memory 604, and the permanent storage device 602. From these various memory units, the one or more processing unit(s) 612 retrieves instructions to execute and data to process in order to execute the processes of the subject disclosure. The one or more processing unit(s) 612 can be a single processor or a multi-core processor in different implementations.

The ROM 610 stores static data and instructions that are needed by the one or more processing unit(s) 612 and other modules of the electronic system 600. The permanent storage device 602, on the other hand, may be a read-and-write memory device. The permanent storage device 602 may be a non-volatile memory unit that stores instructions and data even when the electronic system 600 is off. In one or more implementations, a mass-storage device (such as a magnetic or optical disk and its corresponding disk drive) may be used as the permanent storage device 602.

In one or more implementations, a removable storage device (such as a floppy disk, flash drive, and its corresponding disk drive) may be used as the permanent storage device 602. Like the permanent storage device 602, the system memory 604 may be a read-and-write memory device. However, unlike the permanent storage device 602, the system memory 604 may be a volatile read-and-write memory, such as random access memory. The system memory 604 may store any of the instructions and data that one or more processing unit(s) 612 may need at runtime. In one or more implementations, the processes of the subject disclosure are stored in the system memory 604, the permanent storage device 602, and/or the ROM 610. From these various memory units, the one or more processing unit(s) 612 retrieves instructions to execute and data to process in order to execute the processes of one or more implementations.

The bus 608 also connects to the input and output device interfaces 614 and 606. The input device interface 614 enables a user to communicate information and select commands to the electronic system 600. Input devices that may be used with the input device interface 614 may include, for example, alphanumeric keyboards and pointing devices (also called "cursor control devices"). The output device interface 606 may enable, for example, the display of images generated by electronic system 600. Output devices that may be used with the output device interface 606 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 6, the bus 608 also couples the electronic system 600 to a network (not shown) through the LAN interface 616 and separately, or jointly, through the WAN interface 618. In this manner, the electronic system 600 can be a part of a network of computers, such as a LAN through the LAN interface 616, a WAN through the WAN interface 618, an Intranet through either of the interfaces 616, 618, or a network of networks through either of the interfaces 616, 618, such as the Internet. Any or all components of the electronic system 600 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In some implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as application specific integrated circuits (ASICs) or field programmable gate arrays (FPGAs). In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an "aspect" may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as a "configuration" may refer to one or more configurations and vice versa.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A distributed adaptive bit rate proxy system, the system comprising:
   a first gateway device comprising a first transcoder and configured to receive segments of a content item from an adaptive bit rate server, wherein the first transcoder of the first gateway device transcodes the received segments of the content item based at least in part on a first adaptive bit rate profile to generate first transcoded segments of the content item; and
   a secondary device comprising a second transcoder, the secondary device being coupled to the first gateway device and configured to receive the segments of the content item from the first gateway device, wherein the second transcoder of the secondary device transcodes the received segments of the content item based at least in part on a second adaptive bit rate profile indicated by the first gateway device to generate second transcoded segments of the content item,
   wherein the first gateway device advertises the first and second adaptive bit rate profiles to first user devices and transmits the first transcoded segments of the content item to the first user devices in response to first requests therefor, and the secondary device transmits the second transcoded segments of the content item to the first user devices in response to second requests therefor.

2. The system of claim 1, wherein the secondary device is configured to receive the first transcoded segments from the first gateway device.

3. The system of claim 1, wherein the secondary device comprises a set-top box.

4. The system of claim 1, further comprising a second gateway device comprising a third transcoder, the second gateway device being configured to receive the segments of the content item, a first indication of the first bit rate profile, and a second indication of the second bit rate profile from the first gateway device.

5. The system of claim 4, wherein the first gateway device is coupled to the secondary device via a first transmission network and the first gateway device is coupled to the second gateway device via a second transmission network that further couples the first gateway device and the second gateway device to a node that is coupled to the adaptive bit rate server via a third transmission network.

6. The system of claim 5, wherein the first gateway device receives the segments of the content item from the adaptive bit rate server via the second transmission network, the node and the third transmission network, and the second gateway device receives the segments of the content item and the first transcoded segments from the first gateway device via the second transmission network.

7. The system of claim 4, wherein the second gateway device is configured to:
   transcode the segments of the content item based at least in part on a third adaptive bit rate profile;
   advertise the first adaptive bit rate profile, the second adaptive bit rate profile, and the third adaptive bit rate profile to second user devices;
   transmit third transcoded segments of the content item to the second user devices in response to third requests therefor;
   retrieve the second transcoded segments of the content item from the secondary device and transmit the second transcoded segments to the second user devices in response to fourth requests therefor; and
   retrieve the first transcoded segments of the content item from the first gateway device in response to fifth requests therefor.

8. The system of claim 1, wherein the secondary device transmits the second transcoded segments of the content item to the first user devices via the first gateway device in response to second requests therefor.

9. A method for providing a distributed adaptive bit rate proxy system, the method comprising:
   transcoding segments of a content item based at least in part on a first adaptive bit rate profile to generate first transcoded segments of the content item;
   transmitting, over a first transmission network to a device comprising a transcoder, an indication of a second adaptive bit rate profile;
   receiving, over the first transmission network from the device comprising the transcoder, second transcoded segments of the content item, the second transcoded segments having been transcoded by the transcoder of the device based at least in part on the second adaptive bit rate profile;
   advertising, over a network, the first and second adaptive bit rate profiles to a user device; and
   transmitting, over the network, one of the first transcoded segments to the user device in response to a first request therefor; and one of the second transcoded segments to the user device in response to a second request thereof.

10. The method of claim 9, further comprising:
    receiving the segments of the content item from an adaptive bit rate server.

11. The method of claim 9, further comprising:
    caching the segments of the content item in a local memory.

12. The method of claim 9, further comprising:
    transmitting, over the first transmission network to the device comprising the transcoder, the segments of the content item in conjunction with the indication of the second adaptive bit rate profile.

13. The method of claim 9, wherein advertising the first and second adaptive bit rate profiles to the user device comprises:
    generating a manifest file that lists the first and second adaptive bit rate profiles; and
    transmitting, over the network, the manifest file to the user device.

14. The method of claim 9, further comprising:
    transmitting, over a second transmission network to a gateway device, the segments of the content item, the first transcoded segments of the content item, and the second transcoded segments of the content item.

15. The method of claim 14, further comprising:
    receiving, over the second transmission network from the gateway device, third transcoded segments of the content item, the third transcoded segments having been transcoded by the transcoder of the device based at least in part on a third adaptive bit rate profile.

16. A computer program product comprising instructions stored in a non-transitory computer-readable storage medium, the instructions comprising:

instructions to receive, by a device, a first manifest file from a proximal adaptive bit rate server via a transmission network, and a second manifest file from a remote adaptive bit rate server over a wide area network;

instructions to provide a third manifest file to a user device over a local area network that is distinct from the transmission network and the wide area network, wherein the third manifest file is generated based on the first manifest file and the second manifest file;

instructions to receive a request for a segment of a content item advertised in the third manifest file from the user device over the local area network;

instructions to retrieve the segment of the content item from the proximal adaptive bit rate server via the transmission network when the segment is included in the first manifest file, otherwise retrieving the segment of the content item from the remote adaptive bit rate server over the wide area network; and instructions to provide the segment of the content item to the user device over the local area network.

17. The computer program product of claim 16, wherein the instructions to retrieve the segment of the content item from the proximal adaptive bit rate server when the segment is included in the first manifest file comprises instructions to retrieve the segment over the transmission network from the proximal adaptive bit rate server.

18. The computer program product of claim 17, wherein the instructions to retrieve the segment of the content item from the remote adaptive bit rate server comprises instructions to retrieve the segment of the content item from the remote adaptive bit rate server via an intermediary device.

19. The computer program product of claim 16, further comprising:
   instructions to generate the third manifest file by merging a first plurality of entries of the first manifest file with a second plurality of entries of the second manifest file.

20. The computer program product of claim 19, further comprising:
   instructions to transcode the segment of the content item based at least in part on an adaptive bit rate profile to generate a transcoded segment; and
   instructions to add an entry to the third manifest file for the transcoded segment.

* * * * *